Oct. 12, 1965   M. I. GLASS ET AL   3,210,887
TOY ANIMAL WITH MOVABLE MOUTH
Filed Nov. 21, 1962
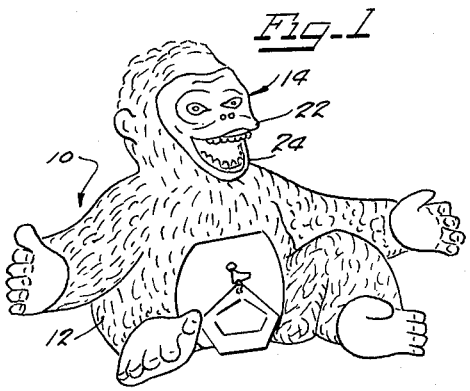
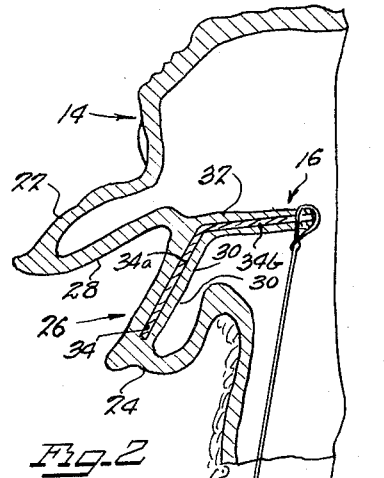
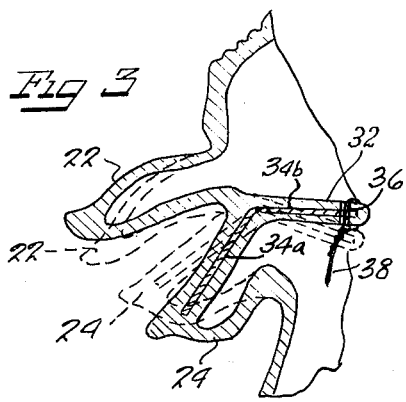
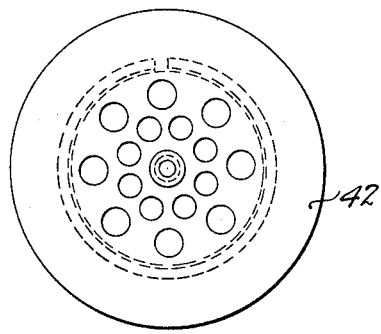
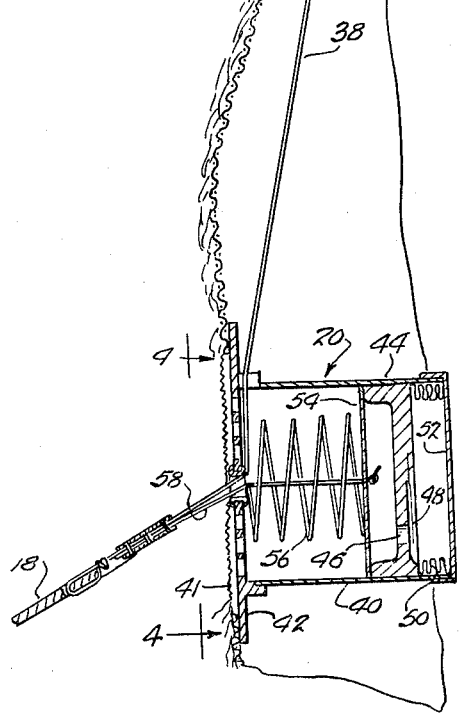
Inventors
MARVIN I. GLASS
HANS E. JERNSTROM
ARTHUR E. NEUMANN
By Soans, Anderson, Luedeka & Fitch
Attys

United States Patent Office 3,210,887
Patented Oct. 12, 1965

3,210,887
TOY ANIMAL WITH MOVABLE MOUTH
Marvin I. Glass and Hans E. Jernstrom, Chicago, and Arthur E. Neumann, Winnetka, Ill., assignors to Marvin Glass & Associates, Chicago, Ill., a partnership
Filed Nov. 21, 1962, Ser. No. 239,122
2 Claims. (Cl. 46—118)

The present invention relates generally to toy figures, and is particularly directed to a toy animal figure including means or altering the facial expression of the figure.

Stuffed animals have long been a favorite with children, and it is a particular object of the present invention to provide a novel form of stuffed animal which is adapted to alter its facial expression in response to an action on the part of the child. A further object of the invention is to provide a toy figure with means whereby the facial expression of the figure can be changed and an accompanying sound emitted from the figure in response to movement of an operating means on the figure. Still another object of the invention is to provide a stuffed animal toy having a resilient face including yieldable upper and lower jaw portions and means for effecting relative movement of such jaw portions and for creating an accompanying appropriate sound, which means is under the control of the child holding the toy figure. Additional objects and advantages will be apparent from the following description of the embodiment illustrated in the accompanying drawings, wherein:

FIGURE 1 is a perspective view of a stuffed animal embodying features of the invention;

FIGURE 2 is an enlarged, fragmentary, sectional view taken along the longitudinal axis of the animal figure;

FIGURE 3 is a partial view of the illustration in FIGURE 2, wherein movement of the upper and lower jaws is indicated by broken lines; and FIGURE 4 is a view taken along line 4—4 in FIGURE 2.

Generally, the illustrated embodiment of the invention comprises a stuffed monkey 10 having its main body portion 12 made of plush fabric and stuffed with cotton, or it may be made of other suitable material such as plastic or the like and suitably covered to simulate the fur of the animal. The face portion 14 of the animal figure is made of a resilient material, such as a vinyl plastic or the like, and at least the forward portion of the head is generally hollow to permit flexing of the resilient face section. The upper and lower jaws of the face are formed to define a normally open mouth for the monkey with the lips parted, and the lower lip portion or jaw is connected with an operating means 16 (FIGURE 2) which is adapted to provide for flexing of the jaws in response to the pulling of a ring 18 and also to create an accompanying, appropriate noise from a soundmaker 20 supported in the stomach of the figure.

With particular reference to FIGURES 2 and 3, it is to be noted that the resilient face portion 14 of the animal is molded or otherwise suitably formed from relatively thin and flexible material, such as a vinyl plastic. Preferably, the remainder of the head of the monkey is relatively rigid, so as to limit the described movement to a change in facial expressions and avoid distortion of the head during operation of the mouth by the child. In the illustrated monkey figure, the upper and lower jaws 22 and 24, respectively, protrued a substantial distance forwardly on the face, as it characteristic with this animal. The inside of the mouth is defined by a generally concave member or portion 26 which is preferably formed integrally with the upper and lower jaws. This concave member 26 includes an upper wall 28 and a lower wall 30, as well as an integrally formed, rearwardly extending section 32 which is joined with the upper and lower walls generally at their juncture. It is also to be noted that the upper and lower wall portions 28 and 30 are spaced apart along most of their length from the outer portions of the face which define the upper and lower jaws. Furthermore, the lower wall portion 30 of the concave member 26 is somewhat thicker than the upper wall portion 28 so as to accommodate an embedded, rigid member 34, which may be of plastic, metal or the like, and so as to influence the distortion of the face in a particular manner.

With respect to the relative thickness of the material forming the face, including the jaws and the inner mouth portion 26, it will be apparent that the initial molding or forming of the face 14 can be regulated to achieve any of a variety of results in expression changes. For example, one portion can be made more flexible than an adjoining portion of the face by making it thinner and/or by positioning it to be more responsive to movement of the operating means. Thus, for example, in the illustrated embodiment, the upper wall 28 is made somewhat thinner than the lower wall 30 and, therefore, is more easily distorted than the lower wall.

The rigid member 34 includes two angular disposed sections, with one section 34a being embedded in and generally coextensive with the lower wall 30 and the other section 34b being embedded in and generally coextensive with the rearwardly projecting portion 32 of the mouth member 26. The rear end portion 34b of the rigid member includes an opening 36 therethrough or is otherwise provided with suitable means affording connection therewith of an operating cord 38. This cord extends downwardly through the body of the figure and through the noisemaker 20 to the ring or handle 18 provided externally of the figure adjacent the stomach portion thereof. The noisemaker 20 includes a cylindrical housing 40 which is fixed to a perforated, circular plate 42 fastened to the inner wall of the stomach and preferably having a thin, fabric covering over its outer face. The cylindrical housing 40 includes a relatively movable piston 44 having an opening 46 therethrough, and a flexible reed 48 secured in position with its free end extending across the opening. A bellows member 50 is disposed between the piston 44 and the inner wall 52 of the cylindrical housing. The forward face of the piston 44 supports a circular plate 54, and a coil compression spring 56 is interposed between the plate 54 and the perforated forward wall 42 of the housing. A cord or the like 58 is connected between the plate 54 and the ring or handle 18, so that pulling of the ring operates the noisemaker and also moves the rigid member 34 to flex the jaws of the monkey.

The disposition of the concave member 26 with respect to the upper and lower jaws 22 and 24, and the disposition of the rigid member 34 embedded therein is such that a pull on the ring 18 causes the entire rigid member 34 to move somewhat downwardly and, at the same time, swing vertically about its intermediate angular section. As evidenced particularly in FIGURE 3, this movement of the rigid member 34 causes an accompanying upward and outward movement of the lower jaw 24 and a downward movement of the upper jaw 22 to simulate closing of the monkey's mouth. Moreover, since the jaws are biased toward an open mouth position, a release of the cord causes the jaws to return to their normally open position. Obviously, appropriate pulling and releasing action of the ring 18 in sequence will provide a jaw movement simulating a talking or chattering action for the monkey figure. Furthermore, such chattering movement of the face or jaws will be accompanied by sounds as the piston 44 is moved axially back and forth within the cylindrical housing 20. In this latter respect, the noisemaker is constructed so that movement of the piston 44 in one direction creates a sound which is somewhat different from that created by movement in the opposite direction. When the piston 44 is moving forwardly, to the left in FIGURE 2, the reed 48 is essentially free to respond to passage of air through the opening 46 into the bellows 50, whereas when the piston 44 moves rearwardly, the rush of air from the bellows 50 pushes the reed 48 against the piston to thereby change the tone or character of the sound created.

It is seen, therefore, that there is provided a toy figure having means for changing the facial expression of the figure so as to simulate life-like action of such figure, and wherein the change of expression is manually controlled by the child. Further, such control is effected from a position at the front of the figure so that the child can clearly correlate his actions in pulling the ring with the change of expression effected in the face of the toy animal figure. Also, the manipulation of the facial expressions of the animal is such that it affords an infinite number of variations in the position of the animal's jaw to thereby add to the play value of the toy. Then too, the operation of the animal by the child is accompanied by various appropriate sounds to further stimulate the child's interest.

Although shown and described with respect to a particular embodiment and a particular animal figure, it will be apparent that various features of this invention may be otherwise employed to advantage without departing from the principles of the invention set forth herein.

What is claimed is:

1. A toy animal figure comprising a body and a head, said head being generally hollow and including a face portion of resilient material having an upper jaw and a lower jaw defining a mouth for the animal, resilient means defining the interior of the mouth and comprising an inwardly extending, generally concave member which is joined at its outer periphery to the lip portions of said upper and lower jaws and which biases said lips to an open mouth position, the walls of said generally concave resilient means being spaced from the adjacent face-defining wall portions of said head and extending generally in the same direction as the latter, said concave member having an integrally formed, elongated portion projecting rearwardly of the mouth from a position adjacent the juncture of the upper and lower walls of said concave member, a generally rigid member fixed to the lower wall of said generally concave member in generally coextensive relation thereto and projecting inwardly of said hollow head in fixed relation to said elongated portion, and operating means connected with the inner end portion of said rigid member and said elongated portion and operable to provide for movement of said elongated portion and said rigid member so as to distort said concave member to a collapsed position wherein said lips are disposed adjacent each other to provide a substantially closed mouth expression for said figure.

2. A toy animal figure comprising a face portion of resilient, deformable material and including a protruding upper lip and a lower lip portion, resilient means defining the interior of the mouth and comprising an inwardly extending, generally concave member joined along its outer edge with said upper and lower lip and biasing said lips to an open position, said concave member including an integrally formed rearwardly extending portion which projects rearwardly from a position adjacent the juncture of the upper and lower walls of the concave member, a rigid member embedded in the lower wall portion of said concave mouth member and said rearwardly extending portion sound producing means within the body of said figure and including a generally cylindrical housing, a piston slidable in said housing and having an opening therethrough, a vibratable reed on said piston in position for vibration in response to the passage of air through the opening in said piston, and a flexible cord member connected with said piston and with said rearwardly extending portion of said concave member, said flexible cord passing through an opening in the body of said figure so that as said flexible cord is pulled away from the body, said rearwardly extending portion and rigid member are operated to deform said resilient mouth-forming means to a substantially collapsed condition with the upper and lower lips substantially closed and said sound mechanism is operated to provide an accompanying sound to the lip movement.

References Cited by the Examiner

UNITED STATES PATENTS

| | | | |
|---|---|---|---|
| 1,359,398 | 11/20 | Levine | 46—117 |
| 1,529,376 | 3/25 | Rosenthal | 46—118 |
| 2,504,541 | 4/50 | Lawson | 46—180 X |
| 2,700,846 | 2/55 | Coe | 46—120 |
| 3,032,922 | 5/62 | Mitchell | 46—135 X |

FOREIGN PATENTS 645,286  10/50  Great Britain.

RICHARD C. PINKHAM, *Primary Examiner.*

DELBERT B. LOWE, *Examiner.*